No. 687,310. Patented Nov. 26, 1901.
E. W. HUGHES.
NUT HOLDER OR FASTENER FOR FISH PLATES OF RAIL JOINTS OR LIKE PURPOSES.
(Application filed Oct. 8, 1900.)
(No Model.)
Fig.1.
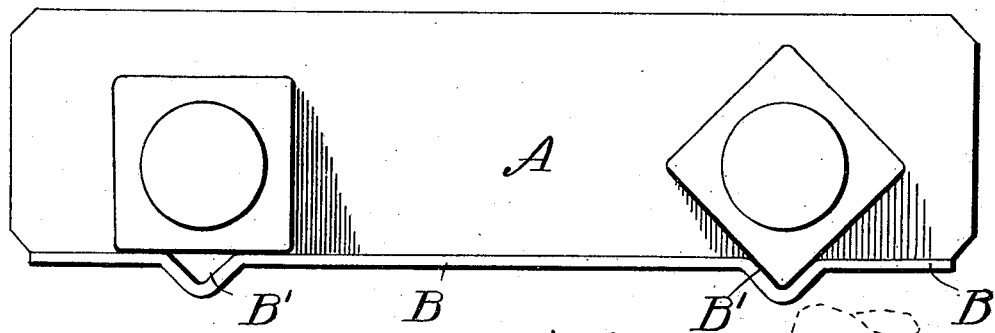
Fig.2.
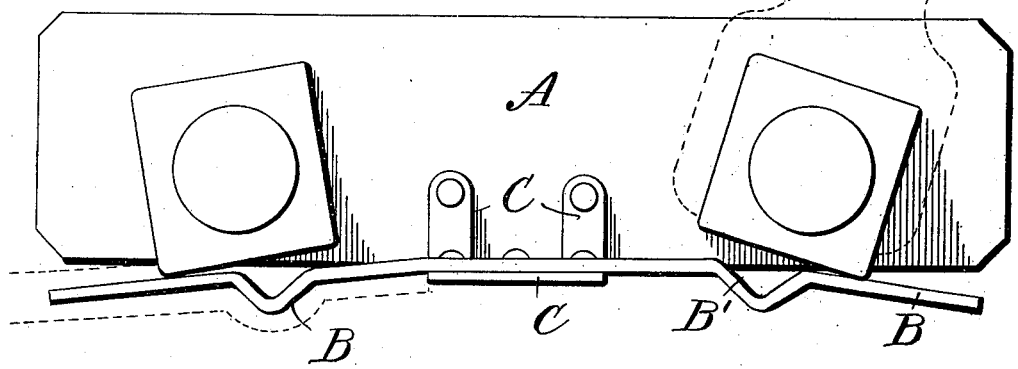
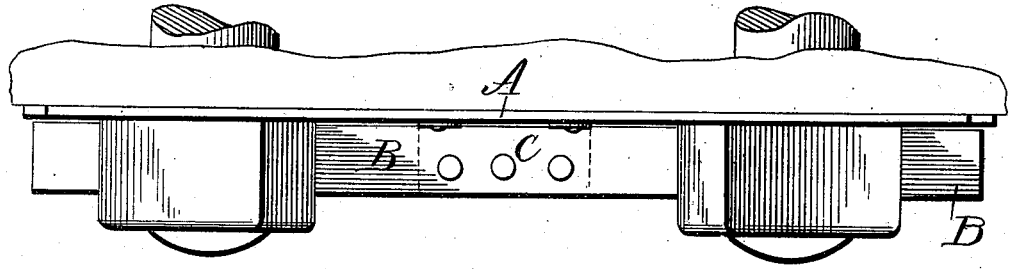
Fig.3.
WITNESSES:
Wm F. Doyle.
J. B. Caldwell.
INVENTOR
Ebenezer W. Hughes,
By R. S. C. Caldwell,
Attorney

UNITED STATES PATENT OFFICE.

EBENEZER WILLIAM HUGHES, OF LONDON, ENGLAND, ASSIGNOR TO EDWARD WILLIAMS, OF BECKENHAM, ENGLAND.

NUT HOLDER OR FASTENER FOR FISH-PLATES OF RAIL-JOINTS OR LIKE PURPOSES.

SPECIFICATION forming part of Letters Patent No. 687,310, dated November 26, 1901.

Application filed October 8, 1900. Serial No. 32,464. (No model.)

*To all whom it may concern:*

Be it known that I, EBENEZER WILLIAM HUGHES, civil engineer, of 94 Shenley road, Camberwell, London, S. E., England, have invented certain new and useful Improvements in Nut Holders or Fasteners for the Fish-Plates of Rail-Joints or Like Purposes, of which the following is a specification.

My improvements are intended for the holding or securing of the nuts of the ordinary or existing bolts used in the present fish-plate joints of permanent ways and for analogous purposes.

The accompanying drawings are illustrative of my invention.

Figure 1 is an elevation showing the nuts stationary and the spring in repose. Fig. 2 is an elevation showing the action of the spring when the nuts are being turned, and Fig. 3 is a plan of Fig. 2.

In accordance with my invention I make use of what I term a "double" or "twin" washer, forming or serving as a link A to connect two or more bolts disposed on the side of the rail-joint. The link A consists of an angle-iron-shaped washer, preferably made of spring-steel or tempered steel, the two bolts passing through each washer in the vertical side, thus holding the washer in position. The horizontal outwardly-projecting portion of this specially-constructed washer according to my invention is cut or sawed for a given distance from each end, leaving an uncut part or portion near the middle and between the two bolts, thus forming a spring-strip B for each nut. The spring-strip B is longer than the distance between the centers of the bolts to provide flat bearing-surfaces for engagement with the sides of the nuts and free projections or extensions beyond the nuts by which the strip may be forced out of engagement with the nuts when it is desired to turn the nuts by hand. In placing the washer A and the nut in position the ends of this spring-strip B are first pressed down by hand or by a suitable tool, so as to enable the nut to be put on by hand, as shown in dotted lines, Fig. 2, and afterward a short spanner is used to screw up the bolts, whereby the long spanner now in use can be dispensed with, thus avoiding elongation of the bolt and thread-stripping, as at present. The spring-strip B is then liberated, whereby it flies up against the side of the nut and holds it fast.

The nuts are preferably hexagonal or square, so that in any case one of the flats or sides is always retained horizontal when the spring-strip is in its effective position.

When occasional adjustment is necessary, no need exists for removing the nut or washer. If preferred, the horizontal spring-strip before described can be curved in various forms, so as to press against and hold the nut in position.

An angle-iron stiffener C, riveted on the center of the link A, is used, if so desired, for strengthening purposes. It forms a very essential feature in my invention, that in the case of square nuts the same can be adjusted to one-eighth turn, and in the case of hexagonal nuts to one-twelfth turn, by forming an angular recess or indentation B' downward in the spring-plate B, directly underneath each nut, the flat side of the nut or corner between two of the flat sides, as the case may be, being held by the spring-strip B, as shown by the nut to the left of Fig. 1, or by its indentation B', as shown by the nut to the right of Fig. 1.

Having now particularly described and ascertained the nature of my said invention and in what manner the same is to be performed, I declare that what I claim is—

In a device of the character described, a pair of bolts, a plate mounted thereon, nuts threaded on the bolts and bearing against the plate, and a resilient strip mounted approximately at its center to the plate at right angles thereto and intermediate of the bolts, said strip being longer than the distance between the centers of the bolts to provide flat bearing-surfaces for engagement with the sides of the nuts and free projections beyond the nuts, and angular depressions formed at the bearing-surfaces of the strip for engagement with the corners of the nuts, substantially as described.

In witness whereof I have hereunto set my hand in the presence of two witnesses.

EBENEZER WILLIAM HUGHES.

Witnesses:
RICHARD STEWART,
BENJ. THOS. KING.